UNITED STATES PATENT OFFICE 2,620,292

CERTAIN ALKYL AR (ISOTHIOCYANOMETHYL) BENZOATES AND THEIR USE AS INSECTICIDES

William S. Emerson and Robert A. Heimsch, Dayton, Ohio, assignors to Monsanto Chemical Company, St. Louis, Mo., a corporation of Delaware No Drawing. Application July 19, 1950, Serial No. 174,801

8 Claims. (Cl. 167—30)

This invention relates to new isothiocyanocarboxylates, to a method of preparing the same, and to pesticidal compositions comprising the new isothiocyano compounds.

The new carboxylates, which we have found to possess high efficiency when employed as insecticides and pesticides in general are esters of (isothiocyanomethyl)benzoic acid having the general formula

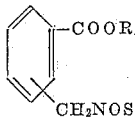

in which R is an alkyl group of from 1 to 8 carbon atoms. As illustrative of esters having the above general formula may be mentioned methyl 4-(isothiocyanomethyl)benzoate, ethyl 4-(isothiocyanomethyl)benzoate, isopropyl 2-(isothiocyanomethyl)benzoate, amyl 3-(isothiocyanomethyl)benzoate, 2-ethylhexyl 4-(isothiocyanomethyl)benzoate, n-octyl 3-(isothiocyanomethyl)benzoate, etc.

The present isothiocyanocarboxylates are obtainable by contacting with an alkali or alkaline earth metal thiocyanate an alkyl ar-(chloromethyl)benzoate substantially according to the scheme:

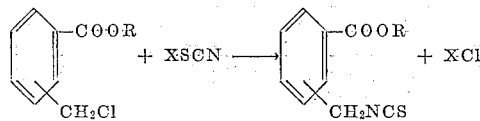

in which R is an alkyl group of from 1 to 8 carbon atoms and X is a member of the class consisting of $NH_4$, and alkali and alkaline earth metals. Alkyl ar-(chloromethyl)benzoates suitable for the present purpose include esters of 2-, 3-, and 4-(chloromethyl)benzoic acids with unsubstituted, saturated, aliphatic alcohols of from 1 to 8 carbon atoms, e. g., methyl 4-(chloromethyl)benzoate, n-butyl 2-(chloromethyl)benzoate, isoamyl 4-(chloromethyl)benzoate, n-hexyl 3-(chloromethyl)benzoate, 2-ethylhexyl 4-(chloromethyl)benzoate, etc. Thiocyanates which may be used are ammonium, potassium, sodium, lithium, barium, calcium, strontium and magnesium thiocyanates.

Reaction of the alkyl ar-(chloromethyl)benzoate with the thiocyanate occurs by contacting the two reactants at ordinary or increased temperatures; however, for optimum yields of the alkyl ar-(isothiocyanomethyl)benzoates, it is preferred to heat a mixture of the chloromethylbenzoate and the thiocyanate, advantageously in the presence of an inert diluent, at a temperature of from, say, 60° C. to the refluxing temperature of the reaction mixture for a time of from a few minutes to several hours. As inert diluents there may be employed aliphatic oxygen-containing compounds, such as methanol, ethanol, isopropanol, isobutanol, acetone, ethyl acetate, and isopropyl ether; hydrocarbons such as hexane, kerosene, benzene or xylene; nitro compounds such as the nitroparaffins and nitrobenzene; halogen-containing compounds such as dichlorobenzene, carbon tetrachloride, ethylene dichloride, etc. In order to facilitate removal of the inorganic chloride which is formed as a by-product, it is preferred to employ as diluent a liquid in which the chloride is substantially insoluble; hence, an organic diluent is generally preferred.

Inasmuch as the reaction involves the condensation of one mole of the chloromethylbenzoate with one mole of the thiocyanate, stoichiometric proportions of the reactants are advantageously employed. However, since any excess of either the ester or the thiocyanate may be readily recovered from the final product, the quantity of reactants initially employed is immaterial. It is preferred, however, to use an excess of the more readily available thiocyanate in order to assure reaction of all of the chloromethylbenzoate under the conditions employed.

The present alkyl ar-(isothiocyanomethyl)benzoates are stable, rather high-boiling materials having a pleasant, aromatic odor. They are particularly valuable as pesticides, but some of this series of esters may also be advantageously employed as water-proofing agents, rubber vulcanization accelerators, lubricant additives, etc. They are also valuable as intermediates in the production of a variety of other industrially important chemical compounds.

A number of thiocyano and isothiocyano organic compounds have been suggested for use as insecticides, but the usefulness of such previously suggested materials has been limited by such factors as poor stability, unpleasant odor, low toxicity to insects at concentrations at which they are non-toxic or non-irritating to humans, etc.

We have found, however, that the present alkyl ar-(isothiocyanomethyl)benzoates possess a high degree of insecticidal activity without the objectionable characteristics of previously known thiocyano or isothiocyano compounds. The present (isothiocyanomethyl)benzoates are highly stable materials which possess a pleasant, spicy odor and good solubility characteristics. They are efficient in very small concentrations against both soft-bodied and scaly insects, and behave simultaneously as stomach and contact insecticides.

The present invention is further illustrated, but not limited, by the following examples:

*Example 1*

This example shows the preparation of methyl 4-(isothiocyanomethyl)benzoate.

A mixture consisting of 39 g. (0.33 mole) of potassium thiocyanate and 400 cc. of ethanol was heated, with stirring, until the thiocyanate dissolved. There was then added to the resulting solution 46 g. (0.25 mole) of methyl 4-(chloromethyl)benzoate. There was immediate formation of potassium chloride. The reaction mixture was refluxed, with stirring, for a time of one hour, allowed to cool and then filtered in order to remove the potassium chloride (14 g. of dried potassium chloride obtained). Ethanol was removed from the filtrate by distillation under reduced pressure, and unreacted potassium thiocyanate was separated from the residue by filtration. Distillation of the combined residue and ethanol washings of the filtered potassium thiocyanate gave 30 g. of crude methyl 4-(isothiocyanomethyl)benzoate, B. P. 138 to 152° C./0.5 mm. Since this crude product contained a small amount of white solids which were formed at the beginning of the distillation, it was filtered and re-distilled to give 27.5 g. of the substantially pure methyl 4-(isothiocyanomethyl)benzoate, B. P. 138 to 139° C./0.3 mm., $n_D^{25}=1.5822$, $$D(\tfrac{25}{25})1.219$$

M. R. observed: 56.65, calcd. 57.30, and analyzing as follows:

|  | Found | Calcd. for $C_{10}H_9O_2NS$ |
| --- | --- | --- |
| Percent C | 58.26 | 57.97 |
| Percent H | 4.45 | 4.35 |

The identity of the product was further established by a negative thiocyanate test (Wood, Organic Reactions, III, p. 254 (1946), Wiley, and a positive isothiocyanate test (Mulliken, Identification of Pure Organic Compounds, IV, p. 18, Wiley (1932)).

*Example 2*

Methyl 4-(isothiocyanomethyl)benzoate was tested as an insecticide as follows:

A precision apparatus was employed for spraying known quantities of the test chemical in acetone solution onto insects. This consists of a horizontal tubular spray tower known as the Hoskins spray chamber and a precision atomizing nozzle known as the Potter nozzle. Acetone alone causes no mortality to sprayed insects when applied in this spray chamber.

Milkweed bugs, *Oncopeltus fasciatus,* were deposited on a filter paper in Petri dishes, and the dishes were placed in one end of the spray chamber. A 0.10 per cent acetone solution of the benzoate was sprayed into the other end of the chamber for 15 seconds. There was employed 20 ml. of the solution. Thirty seconds after spraying, the insects were removed from the chamber and placed on a clean filter paper and Petri dish. Observation of the insects after the expiration of 24 hours revealed a 100 per cent kill. This test was strictly a contact spray test, since the insects were exposed to the benzoate for only the 15 second period.

In another experiment the benzoate was tested against the flour beetle, *Tribolium castaneum.* Petri dishes were sprayed with a one per cent acetone solution of the benzoate, employing the spraying equipment described above, and the dishes were used for observing the effect of the spray residue alone against the beetles. The sprayed dishes were allowed to dry at room temperature for a period of 24 hours, and the beetles were then placed into the dried dishes. Observation of the beetles after 24 hours revealed a 100 per cent kill.

Other alkyl ar-(isothiocyanomethyl)benzoates which may be employed as insecticides include n-propyl 3-(isothiocyanomethyl)benzoate, isobutyl 2-(isothiocyanomethyl)benzoate, n-hexyl 4-(isothiocyanomethyl)benzoate, etc.

The present alkyl ar-(isothiocyanomethyl)-benzoates may be generally applied by dissolving them in the usual organic solvents, e. g., acetone, benzene, carbon tetrachloride, etc. and spraying or atomizing the resulting solutions, or they may be dissolved in liquefied gases such as the fluorochloroethanes or methyl chloride and applied from aerosol bombs made from the solutions.

Water suspensions of the benzoates may also be used for spraying and atomizing.

Instead of employing liquids as carriers and diluents, insecticidal dusts comprising the present benzoates may be prepared. For example, the benzoates may be incorporated with a solid carrier such as talc, clay, lime, bentonite, pumice, fuller's earth, etc., and employed generally as pesticidal dusts.

What we claim is:

1. Alkyl ar-(isothiocyanomethyl)benzoates having the general formula

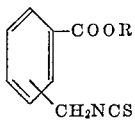

in which R is an alkyl radical of from 1 to 8 carbon atoms.

2. Methyl 4-(isothiocyanomethyl)benzoate.

3. An insecticidal composition comprising an inert carrier and, as the essential active ingredient in a quantity which is toxic to insects, an alkyl ar-(isothiocyanomethyl)benzoate having the general formula

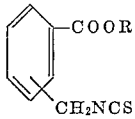

in which R is an alkyl radical of from 1 to 8 carbon atoms.

4. An insecticidal composition comprising an inert carrier liquid and, as an active ingredient in a quantity which is toxic to insects, an alkyl ar-(isothiocyanomethyl)benzoate having the general formula

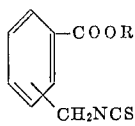

in which R is an alkyl radical of from 1 to 8 carbon atoms.

5. An insecticidal composition comprising an inert carrier liquid and, as an essential active ingredient up to 1.0 per cent by weight of an alkyl ar-(isothiocyanomethyl) benzoate having the general formula

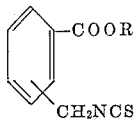

in which R is an alkyl radical of from 1 to 8 carbon atoms.

6. An insecticidal composition comprising an inert carrier liquid and methyl 4-(isothiocyanomethyl) benzoate, said benzoate being present in a quantity which is toxic to inserts.

7. The method of destroying insects which comprises exposing said insects to an insecticide comprising an inert carrier and, as an essential active ingredient in a quantity which is toxic to said insects, an alkyl ar-(isothiocyanomethyl)-benzoate having the general formula

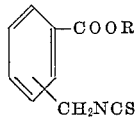

in which R is an alkyl radical of from 1 to 8 carbon atoms.

8. The method of destroying insects which comprises exposing said insects to an insecticidal composition an inert carrier and comprising methyl 4-(isothiocyanomethyl) benzoate, as an essential active ingredient in the quantity which is toxic to said insects.

WILLIAM S. EMERSON.
ROBERT A. HEIMSCH.

REFERENCES CITED

The following references are of record in the file of this patent:

UNITED STATES PATENTS

| Number | Name | Date |
|---|---|---|
| 2,000,004 | Adams | May 7, 1935 |
| 2,080,770 | Goldschmidt et al. | May 18, 1937 |
| 2,462,433 | Searle | Feb. 22, 1949 |